Oct. 22, 1968 T. J. GRUBER 3,406,789
REVERSING VALVE
Filed July 29, 1965 3 Sheets-Sheet 1
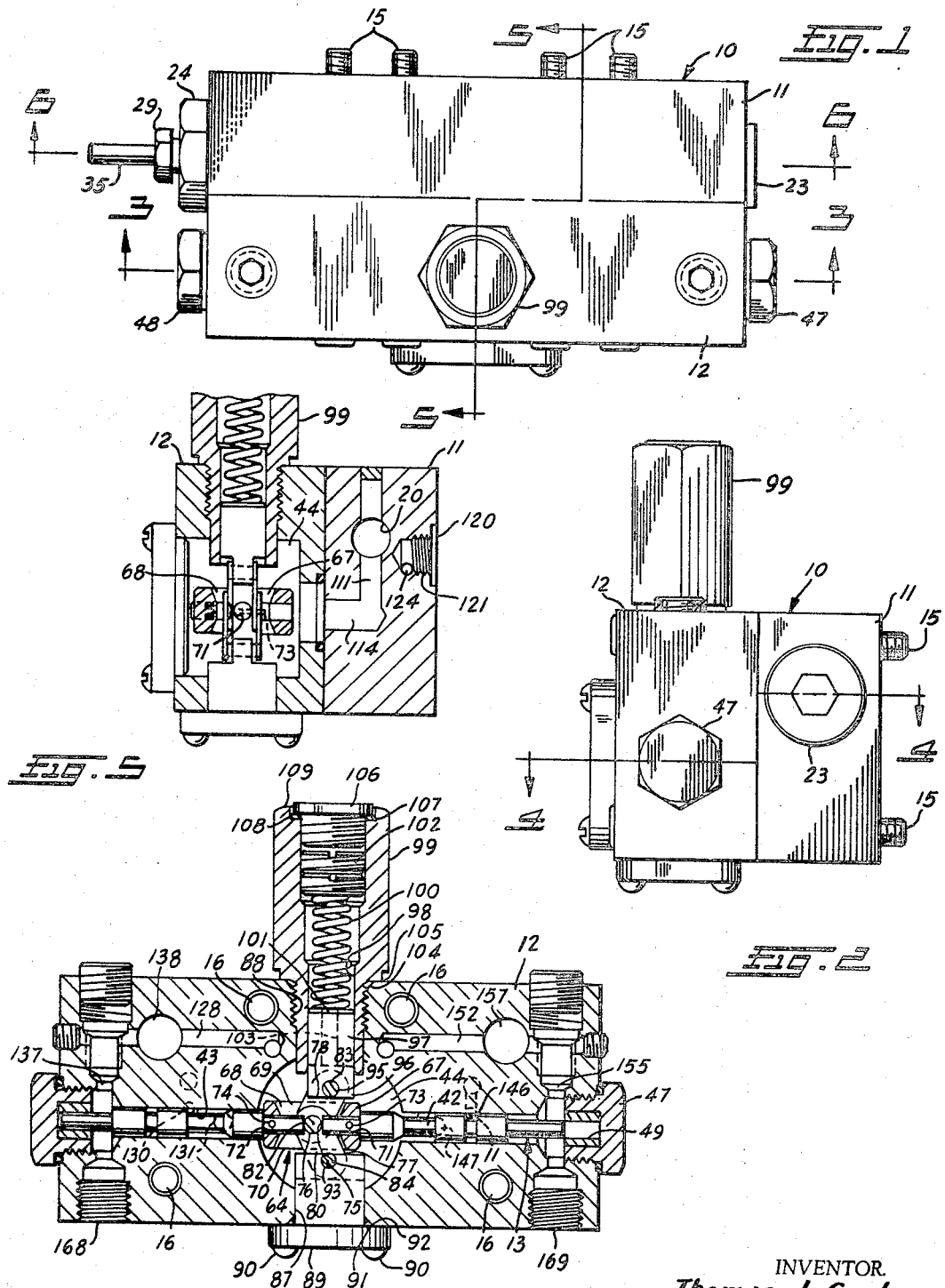
INVENTOR.
Thomas J. Gruber
BY
ATTORNEYS Oct. 22, 1968  T. J. GRUBER  3,406,789
REVERSING VALVE
Filed July 29, 1965  3 Sheets-Sheet 2
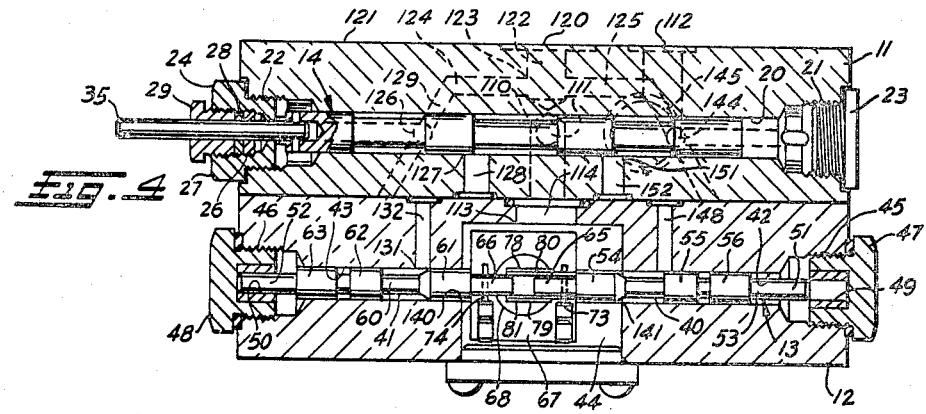
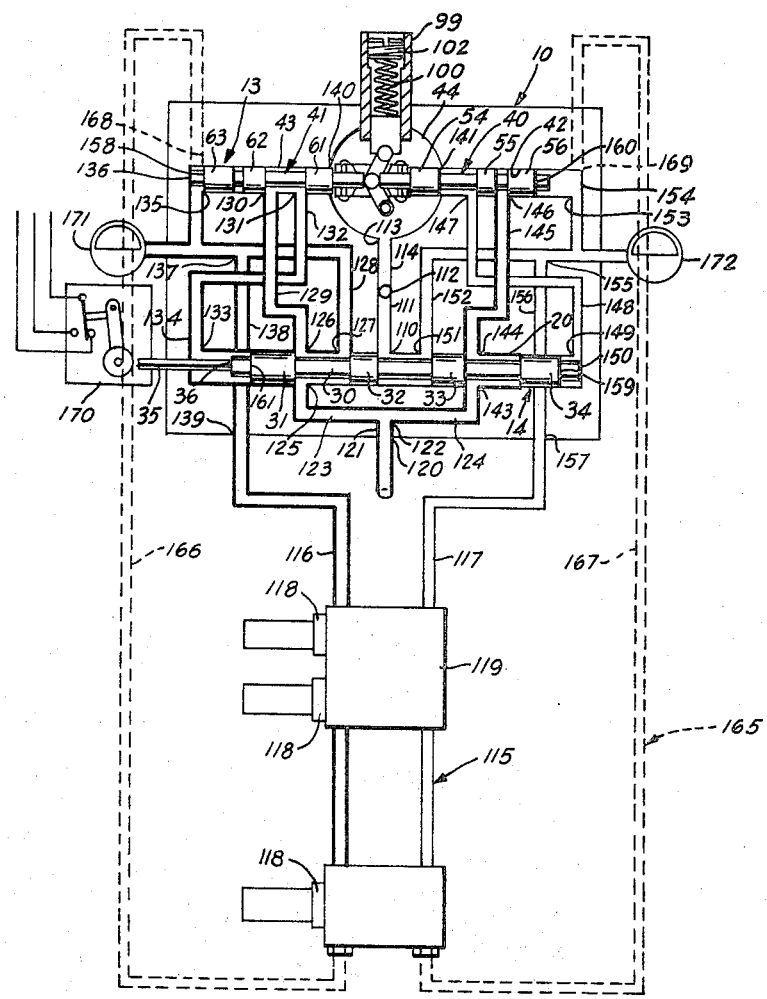
INVENTOR.
Thomas J. Gruber
BY
ATTORNEYS

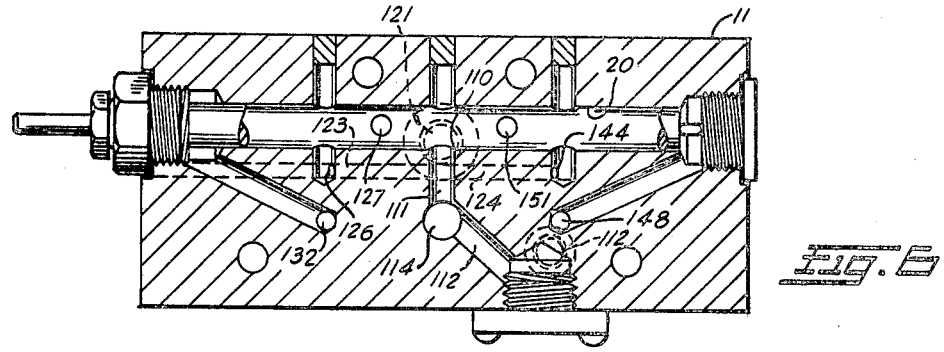
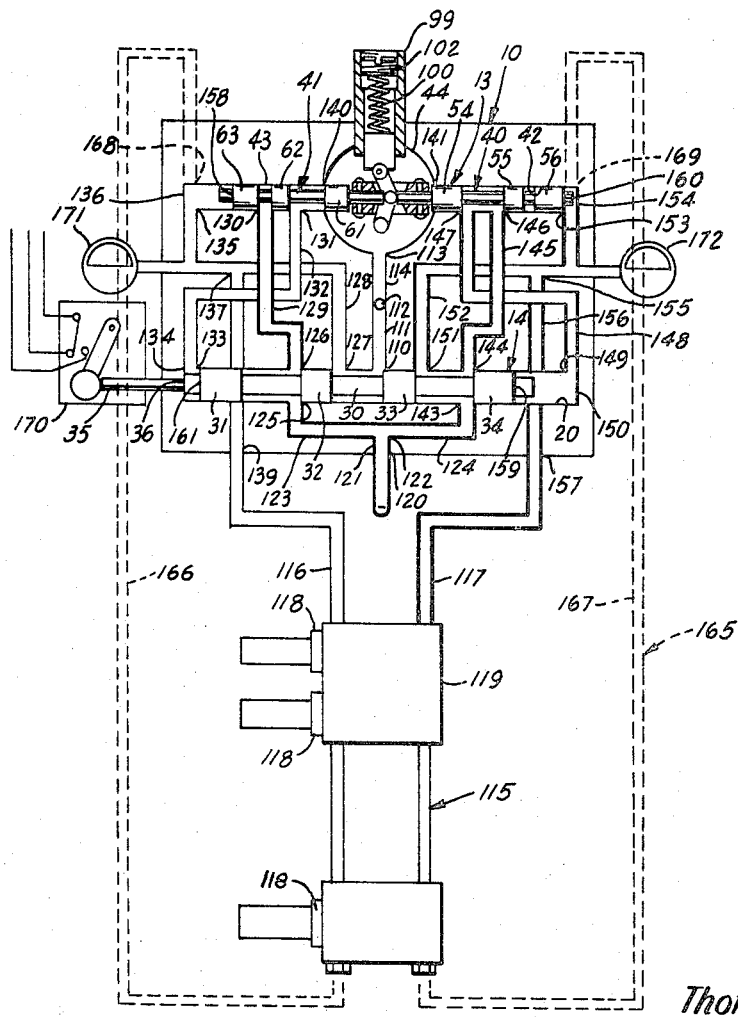

United States Patent Office 3,406,789
Patented Oct. 22, 1968

3,406,789
REVERSING VALVE
Thomas J. Gruber, Chagrin Falls, Ohio, assignor to Eaton
Yale & Towne Inc., a corporation of Ohio
Filed July 29, 1965, Ser. No. 475,639
3 Claims. (Cl. 184—7)

ABSTRACT OF THE DISCLOSURE

A reversing valve for controlling the flow of lubricant in a two line type of centralized lubricating system. The reversing valve consists of a flow diverter piston for controlling the flow of lubricant in one or the other of the lubricant lines and a pilot piston for controlling the operation of the diverter piston. The pilot piston includes a spring biased toggle mechanism coacting with the piston for limiting movement of said piston to either a first or second position. A pressure build up in the lubricant line acts in opposition to the spring biased toggle mechanism to reverse the pilot piston. Pilot piston movement in turn produces a reversal of the flow diverter piston thereby permitting a flow of pressurized lubricant into the alternate lubricant line.

---

This invention relates to hydraulic lubricating systems, and more particularly to an apparatus for controlling the flow of lubricant in a dual line type of lubricating system.

The dual line lubricating system essentially comprises one or more lubricating valves for metering lubricant to a part requiring such lubricant, e.g. a bearing, and a pair of feed lines or conduits leading from the various lubricating valves to a main control device or reversing valve for alternately directing the flow of the lubricant through the lines. Lubricant is pumped from a main source of supply, e.g. reservoir, through the reversing valve and alternately fed through each conduit to the various lubricating valves for metering to the parts requiring lubricant.

The reversing valve generally consists of two operating valves or pistons, one piston known as a fluid diverter piston for controlling the flow of fluid or lubricant in the pair of feed lines, and the other piston known as a pilot piston for controlling the operation of the first or fluid diverter piston.

A problem encountered in the above briefly described dual line system is that the pilot or activating piston has a tendency to "center," that is, the pressure of the lubricant against the piston causes it to "hang-up" or become inoperative in its piston chamber. This invention solves that problem by providing a novel activating piston and mechanism for overcoming this "centering" tendency.

Briefly stated, then, this invention is embodied in a lubricating system having at least one pair of feeds or conduits, a primary valve responsive to fluid pressure for alternately directing the flow of lubricant through the conduits, a secondary valve initially movable under pressure generated in the conduits for producing the fluid pressure controlling the operation of the primary valve, a reservoir for storing the lubricant, and a pump for pumping the lubricant through the system. In accordance herewith, there is provided a split secondary valve or piston having two spaced apart valve or piston sections movable in unison along the same axis. Means, e.g. a spring biased toggle mechanism, disposed between the sections, coacts with them for transferring force alternately applied to opposing ends of the sections and for retarding initial movement of the secondary valve and accelerating its final movement.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

The following description will be better understood by having reference to annexed drawings, wherein:

FIG. 1 is a top view of the reversing valve of this invention;

FIG. 2 is a side view of the reversing valve;

FIG. 3 is a sectional view of the reversing valve taken in the plane indicated by the line 3—3 of FIG. 1;

FIG. 4 is a sectional view of the reversing valve taken in the plane indicated by the line 4—4 of FIG. 2;

FIG. 5 is a sectional view of the reversing valve taken in the plane indicated by the line 5—5 of FIG. 1 showing only a portion of the toggle linkage spring housing;

FIG. 6 is a sectional view of the reversing valve taken in the plane indicated by the line 6—6 of FIG. 1;

FIG. 7 is a diagrammatic illustration of the porting and passageway or line system used in the reversing valve, showing in particular the positions of the pistons for controlling flow of hydraulic fluid in one of the dual lines; and FIG. 8 is a diagrammatic illustration of the porting and passageway system in the reversing valve, showing in particular the position of the pistons for controlling the flow of hydraulic fluid to the other of the dual lines.

Referring generally to FIGS. 1–8, and more particularly to FIGS. 1 and 2, there is shown a reversing valve generally indicated at 10. The reversing valve 10 because of the numerous ports and conduits or lines, is conveniently formed from front and rear sections 12 and 11, resepectively. The front section 12 will hereinafter be known as the pilot section as it contains a pilot piston or valve generally indicated at 13, and the rear section 11 will hereinafter be known as the diverter section as it contains a flow diverting piston or valve generally indicated at 14. The pilot section 12 and the diverter section 11 are secured together by any suitable means, e.g. bolts 15 suitably engaged in aligned holes 16 in the two sections.

The diverter section 11 has a piston or valve chamber 20 longitudinally extending through it. The flow diverter piston 14 reciprocates within the piston chamber 20. The open ends 21 and 22 of the piston chamber 20 are enlarged and threaded to receive diverter plugs 23 and 24, respectively, the plugs 23 and 24 are provided to seal the open ends 21 and 22, respectively, of the piston chamber 20.

The flow diverter piston or valve 14 comprises an elongated cylindrical valve stem or piston rod 30 having a plurality of concentrically disposed lands or piston heads 31, 32, 33 and 34 spaced along the rod 30 in port closing and opening relation to the various ports communicating with the piston chamber 20. (FIGS. 4, 6 and 7).

An elongated stem 35 is secured to the piston rod end 36 by any suitable means. A plurality of successively larger openings or bores 25, 26 and 27 are centrally disposed in the diverter plug 24. The stem 35 extends through and reciprocates in the aforesaid bores 25, 26 and 27. The stem 35 is provided as a safety device to visually check the operation of the flow diverter piston 14. Hydraulic fluid is kept from flowing through the diverter plug 24 by a pliable annular sealing gasket 28 disposed in the plug bore 26 and surrounding the stem 35. The seal 28 is held in position by a screw plug 29 surrounding the stem 35 and threadably engaged in the plug bore 27. The other diverter plug 23 has a centrally disposed opening adjacent the piston chamber 20. The flow diverting valve or piston 14 reciprocates within the piston chamber 20 between diverter plugs 23 and 24. The flow diverting piston 14 controls the flow of hydraulic fluid from the reversing valve 10. The flow diverting valve or piston 14 is activated or caused to move by fluid pressure produced by movement of the pilot piston 13 in the pilot section 12.

The pilot piston 13 is a split piston, that is, it comprises a pair of axially aligned spaced apart pistons or valve sections 40 and 41. Pistons 40 and 41 reciprocate in unison in spaced apart axially aligned piston bores or chambers 42 and 43, respectively. The piston chambers 42 and 43 communicate with and radiate from an enlarged toggle chamber 44. The longitudinal axis of the axially aligned bores 40 and 41 is, preferably, parallel to the longitudinal axis of the flow diverter piston chamber 20. The open ends 45 and 46 of piston chambers 42 and 43, respectively, are enlarged and threaded to receive pilot plugs 47 and 48, respectively. The plugs 47 and 48 are used to seal the open ends of the piston chambers 42 and 43, respectively. Centrally disposed openings 49 and 50, respectively, extend into the plugs 47 and 48 adjacent the piston chambers 42 and 43, respectively. The openings 49 and 50 are designed to receive piston rod ends 51 and 52, respectively, of pistons 40 and 41, respectively, as they reciprocate.

The pilot piston section 40 comprises a piston rod or valve stem 53 having a plurality of concentrically disposed lands or piston heads 54, 55 and 56 spaced along the rod 53 in port closing and opening relationship to the numerous ports communicating with its piston on valve chamber 42.

The pilot piston section 41 comprises a piston rod or valve stem 60 having a plurality of concentrically disposed lands or piston heads 61, 62 and 63 spaced along the rod 60 in port opening and closing relation to the various ports communicating with its piston or valve chamber 43.

A spring biased toggle mechanism generally indicated at 64 is mounted within the enlarged chamber 44 between the piston rod ends 65 and 66 of pistons 40 and 41, respectively, and coact with the pistons 40 and 41 to retard their initial movement, and to accelerate their final movement. Toggle mechanism 64 comprises a toggle bar 67 having a configured slot 68 extending through it, the longitudinal axis of the slot 68 being transverse to the axis along which the pilot piston 13 moves. The configured slot 68 includes a pair of frusto-conically shaped recesses in 69 and 70 in back-to-back relation, whose surfaces slope or converge towards the center of the toggle bar 67. The toggle bar 67 has a pair of spaced apart axially aligned bores 71 and 72 which are right angles to the slot 68. The rod ends 65 and 66 of pistons 40 and 41, respectively, are inserted and secured in the bores 71 and 72, respectively, by any suitable means, e.g. pins 73 and 74, respectively. When secured to the toggle bar 67, the confronting rod extremities 75 and 76 of rod ends 65 and 66, respectively, are in spaced apart relation within the configured slot 68.

A toggle 77 is insertable in the configured slot 68 and coacts with the rod extremities 75 and 76 of the pilot piston sections 40 and 41, respectively. The toggle 77 comprises two pairs of, preferably, similar parallel spaced apart toggle arms or links 78 and 79, and 80 and 81, which are joined together at one end by any suitable means, e.g. pivot pin 82. When the toggle 77 is properly disposed within the slot 68, the pivot pin 82 is between and in abutting relation to the confronting rod extremities 75 and 76 of pilot piston sections 40 and 41, respectively. The free ends of each pair of toggle arms are held in parallel spaced relation by a link pin, e.g. arms 78 and 79, are held in spaced relation by link pin 83, and arms 80 and 81 are held in spaced relation by link pin 84.

A pair of axially aligned bores 87 and 88 are formed in the pilot section 12. The longitudinal axis of the bores 87 and 88 are at the right angles to the longitudinal axis of the pilot piston chambers 42 and 43. The bores 87 and 88 communicate with the enlarged chamber 44. The piston chambers 42 and 43 and the bores 87 and 88 radiate from the toggle chamber 44. A fixed toggle mounting 89 is secured within the bore 87 by any suitable means, e.g. screws 90. A pliable sealing ring 91 coacts between the toggle mounting 89 and an adjacent chamfered edge 92 of the bore 87 for keeping hydraulic fluid within the chamber 44. The pivot or toggle pin 84 is rotatably mounted on the toggle mount 89 in fixed relation to the longitudinal axes of the piston chambers 42 and 43, within a complementary configured slot 93 formed in an adjacent toggle mounting portion 94.

The opposing pivot or toggle pin 83 is mounted in a complementary configured slot 95 formed in an adjacent edge 96 of a spring biased movable toggle adapter or mounting 97. The toggle adapter 97 is slidably mounted within the bore 98 of an adapter housing 99, which is threadably secured in the pilot section bore 88. The toggle adapter 97 is spring biased in a direction towards the fixed toggle mounting 89 by any suitable means, e.g. a helix spring 100 disposed within the bore 98 and coacting between the adapter end 101 and an adjustable plug 102 which is threadably engaged within the bore 98. The toggle pin 83 is movable to and from the toggle pin 84 in the fixed mounting in a plane passing through the centers of the pins 83 and 84, the plane being normal to the axes of the piston chambers 42 and 43. The plug 102 compresses the spring 100 as it is threadably moved farther into the bore 98. Thus, the spring 100 is tensioned to produce more or less force against the toggle adapter 97. The spring biased toggle adapter 97 coacts with the fixed toggle mounting 89 to exert compressive force against the free ends or link pins 83 and 84 of the toggle 77, which force varies as the toggle adapter 97 moves to and from the fixed toggle mounting 89. In this manner the initial movement of the toggle 77 is retarded, and its final movement accelerated. A centrally disposed passageway 103 extends through the toggle adapter 97. The passageway 103 is provided to equalize the hydraulic fluid pressure on the adapter 97, and to lubricate the sides of the adapter bore 98. The toggle arms 78 and 79, and 80 and 81 should be angularly disposed to each other in their respective positions. The force to initially move the piston sections 40 and 41, is in proportion to this angular disposition. This angle or disposition is largely controlled by the slope of the configured sides, e.g. recesses 69 and 70, of the slot 68. Recesses 69 and 70 provide safety means for limiting the rotation of the toggle arms 78 and 79, and 80 and 81. The adapter housing 99 sealingly coacts with a pliable sealing ring 104 lying against an adjacent chamfered edge 105 of the bore 88.

A cap screw 106 for sealing the adapter bore 98 is threaded into the bore 98 behind the adjustable plug 102. The plug 106 exerts pressure against an annular sealing ring 107 lying in an annular recess 108 formed in the adapter housing end 109.

Referring more particularly to FIGS. 7 and 8, there is shown a dual line system generally indicated at 115. In such a system, the hydraulic fluid is pumped from a source of fluid supply, e.g. a fluid reservoir (not shown), into a reversing valve 10. The reversing valve alternately directs the flow of hydraulic fluid through a pair of lines or conduits 116 and 117 leading to a conventionally designed dual line valve, e.g. valve 118, or a plurality of such valves grouped together as indicated at 119. The valves 118 in turn meter lubricant or hydraulic fluid to the parts requiring such lubricant. The interrupted flow of lubricant to the various parts is caused by reciprocating valves or pistons within the conventionally designed dual line valves 118. Such valving action alternately causes back pressure in lines 116 and 117 which forces the pilot pistons 40 and 41 to reciprocate in their respective chambers 42 and 43. The toggle mechanism 64 coacts with the pilot piston 13 to keep it reciprocating within the bore and preventing it from "centering," that is hanging up within the bore and not moving in either direction. The pilot piston 13 as it moves produces fluid pressure which activates the flow diverter piston 14, which alternately directs lubricant or hydraulic fluid to the lines or conduits 116 and 117. The cycle is constantly repeated and spurts of lubricant are fed to the parts requiring it.

Porting and conduit system

Lubricant or hydraulic fluid is continuously pumped from a source of supply, e.g. a reservoir (not shown), to an inlet port 120 in the reversing valve 10. The inlet port 120 communicates with a main supply line or passageway 121 leading to and communicating with port 122. The main supply passageway 121 branches into a primary supply line 123 and a secondary supply line 124 both of which communicate with port 122. The primary supply line 123 and the secondary supply line 124 are pressurized, i.e. always containing fluid under pressure. Primary supply line 123 communicates with port 125 in the flow diverter piston chamber 20. Port 125 is always open to piston chamber 20 between piston lands 31 and 32.

Primary and secondary feed lines from the primary supply line 123

A pair of spaced apart ports 126 and 127 in chamber 20 communicate with port 125. Port 126 is always open to port 125 between piston lands 31 and 32, and is, therefore, always pressurized. Port 127 is alternately pressurized and depressurized, that is, port 127 alternately communicates with pressurized port 125, and a continuously depressurized port 110 communicating with drainage passageway 111 which communicates with the drainage outlet or port 112 in communication with the reservoir (not shown). The piston land 32 alternately opens and closes the depressurized port 110 to the port 127 as the flow diverter piston 14 reciprocates. The primary supply line 123 is divided into a primary feed line 128 communicating with port 127, and a secondary feed line 129 communicating with port 126.

Secondary feed line 129 from primary supply line 123

The secondary feed line 129 communicates with port 130 in the pilot piston chamber 43. The secondary feed line 129 and port 130 are always pressurized. The port 130 alternately communicates with piston chamber 43 between the piston lands 61 and 62 and piston lands 62 and 63 of the pilot piston section 41. The port 130 alternately communicates with port 131 in the piston chamber 43 adjacent port 130. The port 131 is alternately pressurized and depressurized by the reciprocating piston land 61, i.e. port 131, alternately communicates with pressurized port 130 between piston lands 61 and 62. And depressurized port 140 communicates with the toggle chamber 44 which is always depressurized since it is open to drainage passageway 114 communicating with the drainage port 112 leading to the reservoir (not shown) through port 113 in the chamber 44. The port 131 communicates with line 132 communicating with port 133 in one end 134 of the flow diverter piston chamber 20. The line 132 is alternately pressurized and depressurized.

Primary feed line 128 from primary supply line 123

The primary feed line 128 communicates with port 135 in the end 136 of the pilot piston chamber 43. The primary feed line 128 is alternately pressurized and depressurized. A port 137 in the primary feed line 128 intermediate ports 127 and 135, communicates with primary outlet line 138 which communicates with a primary outlet port 139. One of the dual lines, e.g. line 116, of the dual line system 115 is attached to and communicates with the primary outlet port 139.

Primary and secondary feed lines from the secondary supply line 124

As previously indicated, the secondary main supply line 124 communicates with the main supply line 121 through port 122. The secondary supply line 124 communicates with port 143 in the flow diverter piston chamber 20. Port 143 is always open to piston chamber 20 between piston lands 33 and 34. The port 143 communicates with spaced apart ports 144 and 151 in the valve chamber 20. The port 144 is always open to port 143 between piston lands 33 and 34, and is, therefore, always pressurized. Port 151 is alternately pressurized and depressurized, that is port 151 alternately communicates with port 143 and depressurized port 110 (previously described). The piston land 33 alternately opens and closes the depressurized port 110 to the port 151 as the flow diverter piston 14 reciprocates. The secondary supply line 124 is also divided into a primary feed line 152 communicating with port 151, and a secondary feed line 145 communicating with port 144.

Secondary feed line 145 from secondary supply line 124

The secondary feed line 145 communicates with port 146 in the pilot piston chamber 42. The port 146 alternately communicates with chamber 42 between piston lands 54 and 55 and piston lands 55 and 56 of the pilot piston section 40. The secondary feed line 145 and port 146 are always pressurized. The port 146 alternately communicates with port 147 in the piston chamber 42 adjacent port 146. The port 147 is alternately pressurized and depressurized by the reciprocating piston land 54, i.e. port 147 alternately communicates with pressurized port 146 between piston lands 54 and 55, and depressurized port 141 communicating with the depressurized toggle chamber 44 (previously described). The port 147 communicates with line 148 communicating with port 149 disposed in the other end 150 of piston chamber 20. The line 148 is alternately pressurized and depressurized.

Primary feed line 152 from secondary supply line 124

The primary feed line 152 communicates with port 153 in the end 154 of pilot piston chamber 42. The primary feed line 152 is alternately pressurized and depressurized. A port 155 in the primary feed line 152 intermediate ports 151 and 153, communicates with secondary outlet line 156 which communicates with a secondary outlet port 157. The other of said dual lines, e.g. line 117, is attached to and communicates with the secondary outlet port 157.

Depressurized system

As previously indicated, the toggle chamber 44 and port 110 are always depressurized. The port 110 communicates with drainage line 111 communicating with the drainage port 112. A depressurized port 113 in the toggle chamber 44 communicates with drainage line 114 also communicating with the drainage port 112. A line (not shown) from the reservoir (not shown) is attached to and communicates with the drainage port 112. The lubricant or hydraulic fluid is continuously pumped into the reversing valve 10 through the inlet port 120, and continuously drained from the reversing valve 10 through the drainage port 112.

Operation

Assuming the flow diverter piston 14 and the pilot piston 13 is to be in the positions shown in the FIG. 7, the pump operates to pump lubricant or hydraulic fluid from the reservoir into the inlet port 120 through the main supply line 121, and into the primary and secondary supply lines 123 and 124, respectively. The lubricant is pumped from the secondary supply line 124 into the piston chamber 20 between lands 33 and 34, through the port 144 into the secondary feed line 145, and into the piston chamber 42 between piston lands 55 and 56.

The lubricant is also pumped from the primary supply line 123 into the piston chamber 20 between piston lands 31 and 32, and into the primary and secondary feed lines 128 and 129. The lubricant is pumped through the secondary feed line 129 into the piston chamber 43 between the piston lands 61 and 62, into the line 132, and into the end 134 of piston chamber 20. Simultaneously, the lubricant is pumped through the primary feed line 128, into the end 136 of piston chamber 43. Lubricant in line 128 is also pumped into the outlet passageway 138, through the outlet port 139 and into one of the dual lines, e.g. line 116.

The other dual line, e.g. line 117, is in communication with the drainage port 112 and is depressurized. The pressurized lines in FIGS. 7 and 8 are more heavily outlined and can be traced more readily. Because of the manner in which the dual line valves 118 operate, back pressure is built up in the line 116. This back pressure exerts a force against the surface 158 of piston land 63 and moves the pilot piston section 41 in a direction towards the toggle chamber 44. The force applied to the piston end 158 is transferred through the toggle 77 to the other pilot piston section 40 moving it in unison toward the piston chamber end 154. The toggle mechanism 64 retards initial movement of the pilot piston 13, but accelerates its final movement towards the chamber end 154.

The pilot piston 13 moves to its position seen in FIG. 8. In moving to this position two things happen. First, the end 134 of the flow diverter piston chamber 20 is depressurized by the piston land 61 moving into the toggle chamber 44 opening the toggle chamber port 140, and the piston land 62 moving to close the pressurized port 130. The line 132 communicating with the chamber end 134 is now in communication with the toggle chamber 44 and depressurized. Secondly, the piston land 54 moves to close the toggle chamber port 141 and pressurized the lubricant in line 148 leading to the other end 150 of the fluid diverter piston chamber 20. Thus, force is exerted against the surface 159 of piston land 34 causing the flow diverter piston 14 to move towards the opposing chamber end 134 (FIG. 8). When the flow diverter piston 14 is in this position, the piston land 32 blocks off the port 127 from the pressurized port 125 and opens the port 127 to the depressurized port 110 which communicates with the drainage line 111 leading to the drainage port 112. As the dual line 116 communicates with the port 127, it becomes depressurized.

This piston land 33 moves to block the port 155 from the depressurized port 110. The piston land 33 moves to block the port 151 from the depressurized port 110 and to open the port 151 to the pressurized port 143. Lubricant is then pumped from the secondary supply line 124 into the primary feed line 152, and out through the discharge port 157 into the other dual line 117. Lubricant will be pumped through dual line 117 until back pressure builds up in this line causing force to be exerted against the surface 160 of piston land 56 causing it to move towards the toggle chamber 44. Once again, the toggle mechanism 64 retards the initial movement of the pilot piston 13 and accelerates its final movement towards the chamber end 136 (FIG. 7). Similarly, line 148 leading to the end 150 of flow diverter piston chamber 20 is depressurized, and the lubricant in line 132 is pressurized applying a force against the surface 161 of piston land 31 moving it back towards the piston chamber end 150. The cycle is repeated as back pressure builds up in dual line 116. In this manner the pilot piston 13 and the fluid diverter piston 14 reciprocate in their respective chambers and lubricant is alternately directed through dual lines 116 and 117 to the conventionally designed dual line valve 118.

The dual line system 115 is known as an end-of-the-line system and may be converted into a loop system generally indicated at 165. This is accomplished by using return lines 166 and 167 which are a continuation of dual lines 116 and 117, respectively. The return lines 166 and 167 are secured to and communicate with the last dual line valve in the lines 116 and 117. The lines 166 and 167 are returned to the reversing valve 10 and communicate with return inlet ports 168 and 169, respectively, in the ends 136 and 154, respectively, of pilot piston chambers 43 and 42, respectively. Resistance in the dual lines, e.g. lines 116 and 117, may be decreased by providing the return lines 166 and 167. For example, where the dual lines 116 and 117 are relatively long compared to return lines 166 and 167, respectively, there would be greater pressure loss in the lines 116 and 117 because of their greater length. Where such pressure loss is undesirable, the loop system 165 may be used.

As previously indicated, a stem 35 may be provided on the flow diverter piston rod end 36. The stem 35 extends from the piston chamber 20, and acts as a visual safety device for checking the operation of the flow diverter piston 14. In certain installations, it may be desirable to provide a limit switch 170 which coacts with the stem 35 as it reciprocates to stop the pump giving the depressurized lines time to drain. Also, depending on the installation pressure gauges 171 and 172 may be provided in primary feed lines 128 and 152, respectively, of the primary supply line 123 and secondary supply line 124, respectively, for checking the fluid pressure in the respective dual lines.

Thus there has been provided a reversing valve having a new and novel pilot piston for actuating the flow diverting piston, which directs fluid alternately into a pair of lines or conduits. The pilot piston provided is split, being composed of a pair of axially aligned spaced apart piston sections which are kept from "centering" within their respective piston chambers by a new and novel spring biased toggle mechanism.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a reversing valve for a multiple line, centralized lubrication system including a movable piston for switching the lubricant flow between said lines and wherein said switching movement of said piston results from movement of a pilot piston, said pilot piston being responsive to pressurized lubricant flow, the improvement comprising:
    toggle means located within a chamber defined by the reversing valve and associated with said pilot piston for retarding initial movement thereof and for causing acceleration thereof, once the pilot piston moves past a predetermined point in said valve body, the toggle means including biasing means mounted on the valve body, for exerting a varying force on the toggle means to obtain the retardation and acceleration of the pilot piston.

2. The reversing valve of claim 1 wherein:
    the toggle means is located within a chamber defined by the reversing valve body, said chamber being substantially isolated from said pressurized lubricant.

3. The reversing valve of claim 2 wherein:
the chamber defined by the reversing valve body is vented to atmospheric pressure.

References Cited

UNITED STATES PATENTS

| | | | |
|---|---|---|---|
| 2,561,786 | 7/1951 | Davis | 184—7 |
| 3,027,973 | 4/1962 | Bricout | 184—7 |

FOREIGN PATENTS

| | | |
|---|---|---|
| 339,012 | 7/1959 | Switzerland. |
| 1,160,216 | 2/1958 | France. |
| 1,029,202 | 4/1958 | Germany. |
| 1,035,421 | 7/1958 | Germany. |

HOUSTON S. BELL, JR., *Primary Examiner.*